(No Model.)　　　　　　　　　　　　　　　　2 Sheets—Sheet 1.
W. J. PERKINS.
BUNK OR FLIGHT FOR CARRIER CHAINS.
No. 531,964.　　　　　　　　　　　　Patented Jan. 1, 1895.
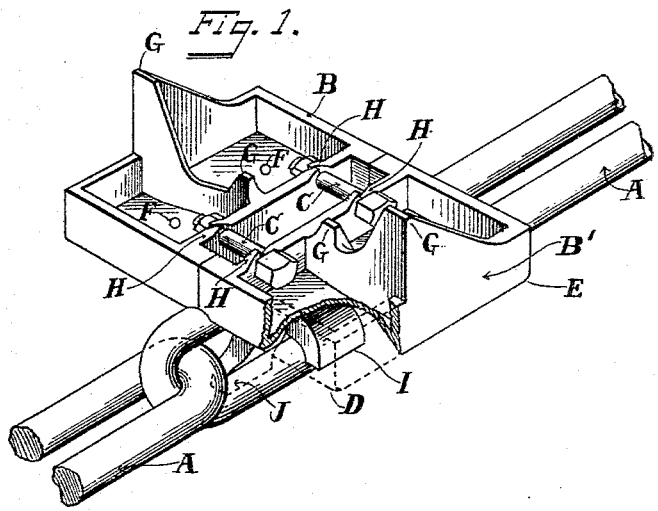
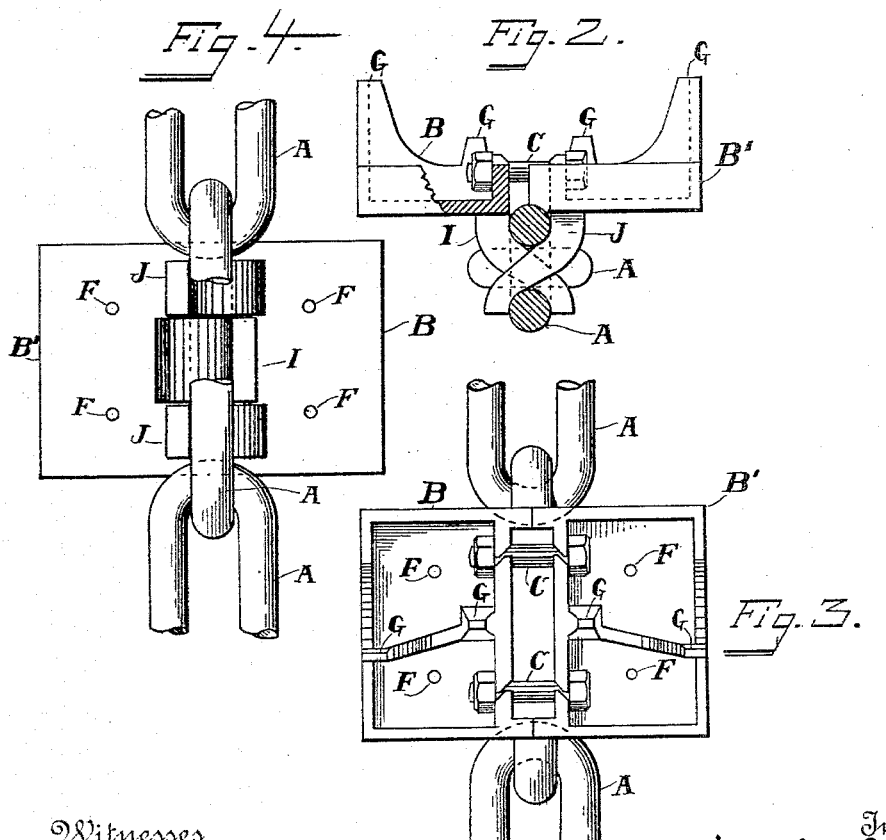
Witnesses
L. C. Hills.
F. B. Keefer
Inventor
Willis J. Perkins
By his Attorney
Marcellus Bailey (No Model.)　　　　　　　　　　　　　　　　2 Sheets—Sheet 2.
W. J. PERKINS.
BUNK OR FLIGHT FOR CARRIER CHAINS.
No. 531,964.　　　　　　　　　　Patented Jan. 1, 1895.
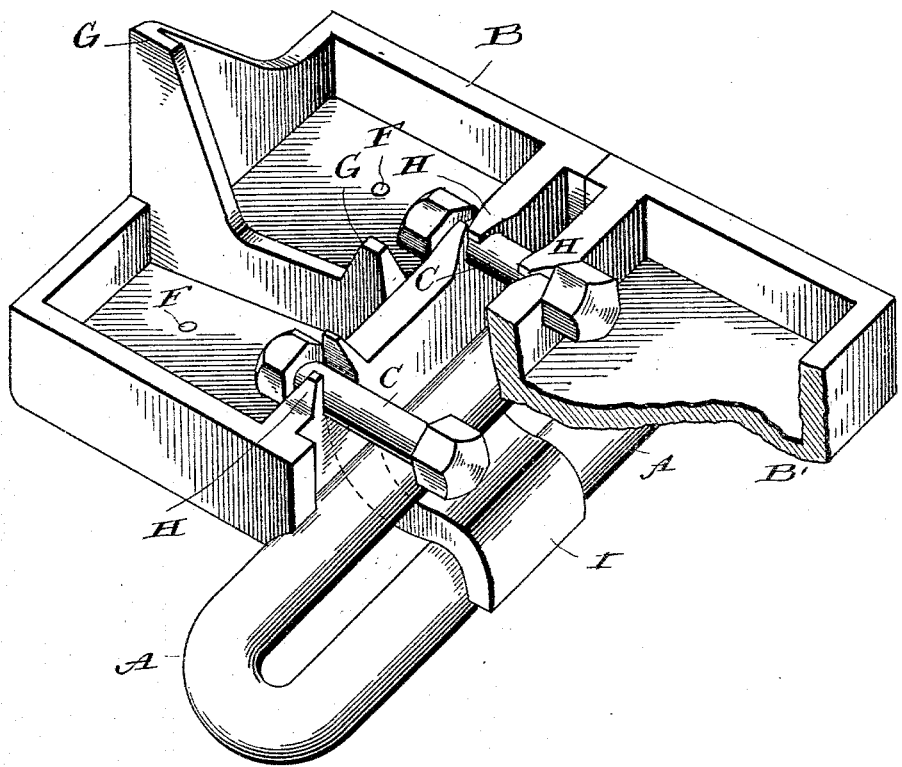
WITNESSES:　　　　　　　　　　　　INVENTOR

UNITED STATES PATENT OFFICE.

WILLIS J. PERKINS, OF GRAND RAPIDS, MICHIGAN.

BUNK OR FLIGHT FOR CARRIER-CHAINS.

SPECIFICATION forming part of Letters Patent No. 531,964, dated January 1, 1895.

Application filed August 13, 1894. Serial No. 520,192. (No model.)

*To all whom it may concern:*

Be it known that I, WILLIS J. PERKINS, of Grand Rapids, in the State of Michigan, have invented certain new and useful Improvements in Bunks or Flights for Carrier-Chains, of which the following is a specification.

My invention has relation to bunks or flights for carrier chains, and, while susceptible in many of its features of general application in that connection, it has reference more particularly to the needs of carrier chains by which the load is carried as dead weight in contradistinction to chains which scrape or push the load before properly arranged flights or bunks.

It is the object of my invention to provide a bunk or flight which can readily be applied to and removed from the chain; also to provide within the bunk a lubricating device; also to provide a bunk which if it should become partly disabled, can be renewed without putting in a whole bunk. For the last named purpose I form the bunk of a plurality of parts detachably connected together, so that any one part can be removed and replaced; and these parts are so constructed that when put together at their place on the carrier chain they will be caused to be clamped as a whole to the chain by the action of the same bolts or other device which bind them together; and for lubricating purposes I provide the body of the bunk with one or more pockets or receptacles for holding a lubricant together with passages therefrom for distributing the lubricant upon the supporting surface over which the bunk passes. These and other features of my invention can however best be explained and understood by reference to the accompanying drawings, in which—

Figure 1 is a perspective view of my improved bunk attached to and in place on a carrier chain—one corner of the bunk being broken away to expose the gripping lugs by which the bunk is held to the chain. Fig. 2 is a front elevation of the bunk with the chain and the inner corner of one part of the bunk in section. Fig. 3 is a top plan, and Fig. 4 is a bottom plan of the device. Fig. 5 is an enlarged perspective view intended to illustrate graphically the manner of forming the sockets for the binding bolts.

The carrier chain A may be of any suitable form or shape. Preferably it is constructed of links of round wrought iron, and of greater length than width.

The bunk is shown at B B', and is preferably made of material of considerable tensile strength, such for example as cast steel, mitis castings, malleable iron or the like. In this instance it is composed of two separate detachably connected parts B, B' provided with gripping lugs I J for engaging the chain, and held together by bolts C, which serve at once to fasten the two parts of the bunk together and to clamp it as a whole to the chain. The gripping lugs which project from the bottom of the parts B B' are of irregular form having approximately an ogee curve. There is one lug I on the part B, and two lugs J J on the part B'; and these lugs are so located that when the parts of the bunk are put together the lug I will come between the two opposite lugs J J. These gripping lugs pass through the chain link to which they are applied and grip both strands of that link as represented in Fig. 2.

The parts B B' are preferably of box form, their bottom being bounded on the edges by upright ribs or flanges. I thus provide them with lubricating pockets or receptacles, these pockets being provided at the bottom with small passages F through which the lubricant can escape.

The bunk is provided with the spurs or lugs G which are adapted to engage the material carried by the bunk.

In the interior opposite walls of the two parts B B' are formed the sockets for the bolts C which hold the two together. These sockets may be drilled into and through these walls if desired, but in lieu of going to that expense I prefer the construction shown in the drawings. Each socket is made say of approximately U form, originally open at the top, and there provided with the upright prongs or lugs H, as shown at one point in Fig. 5. The bolts are laid in these sockets, and then the prongs H are battered or swaged down toward each other and over the bolt, thereby preventing it from lifting from the socket as indicated for the right hand bolt in Fig. 5. In this way the expense of drilling the casting can be dispensed with. The bolts draw the two half bunks tightly up against the two strands of the chain link engaged by their gripping lugs, binding them solidly upon the link, and preventing them from either longitudinal or rotary movement thereon.

In the use of my invention, a series of these bunks is attached to a chain of suitable form and construction combined with driving mechanism therefor having sufficient power to handle the load which may be placed upon the bunks. A chain of this character is more particularly used for drawing logs and timber into mills, although of course it may be used for many other and various purposes. The same chain with the same or differently formed carrying devices may be employed for transferring logs and timber from one body of water to another or from the water on to a train of cars or the like.

In all cases where bunks of this nature are used to carry material from out of water, it is desirable that the ways or tracks on which the bunks slide or move shall be kept properly lubricated. It is with this in view that I have provided the bunks with pockets and have drilled holes in the bottoms of the same. As the bunks dip into the water the pockets or boxes will be filled with the same, and when they emerge they will carry with them this charge of water, which will gradually pass out through the small holes F upon the track or ways, thus giving to the latter the lubrication proper and necessary for the easy transportation of the load.

Having described my improvements and the best way now known to me of carrying the same into practical effect I desire to say in conclusion that I do not restrict myself to the particular structure hereinbefore described and illustrated, since manifestly many modifications, changes and alterations can be made in the same without departing from the spirit of my invention. I reserve the right to all such modifications.

What I claim to be new herein and of my own invention is as follows:

1. The combination with a carrier chain of a two part bunk provided with gripping lugs to engage the chain and means for fastening together the two parts of the bunk, substantially as hereinbefore set forth.

2. The combination with a carrier chain of a bunk composed of a plurality of parts and provided with interlocking gripping lugs adapted to engage the chain link from opposite sides, and to embrace both strands thereof, substantially as hereinbefore set forth.

3. The combination with a carrier chain of a two part bunk having gripping lugs which enter the chain link from opposite sides and embrace both strands thereof, and means for binding together the two parts of the bunk.

4. The combination with a carrier chain of a bunk having gripping lugs thereon adapted to engage and grip laterally both strands of the chain link to which the bunk is applied, and means for clamping or binding said lugs in place, substantially as hereinbefore set forth.

5. A bunk having an open socket for reception of a binding bolt and lugs at the upper end of the socket adapted to be swaged or battered down over the bolt placed in said socket, substantially as hereinbefore set forth.

In testimony whereof I affix my signature in presence of two witnesses.

WILLIS J. PERKINS.

Witnesses:
C. J. CLARKE,
WM. BROWN.